United States Patent
Chai et al.

(10) Patent No.: US 9,413,474 B2
(45) Date of Patent: Aug. 9, 2016

(54) EFFICIENT LARGE-SCALE MULTIPLE INPUT MULTIPLE OUTPUT COMMUNICATIONS

(71) Applicant: NEC Laboratories America, Inc., Princeton, NJ (US)

(72) Inventors: Eugene Chai, Princeton, NJ (US); Xiufeng Xie, Madison, WI (US); Mohammad Khojastepour, Lawrenceville, NJ (US); Karthikeyan Sundaresan, Howell, NJ (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/738,230

(22) Filed: Jun. 12, 2015

(65) Prior Publication Data
US 2015/0365142 A1  Dec. 17, 2015

Related U.S. Application Data

(60) Provisional application No. 62/011,196, filed on Jun. 12, 2014, provisional application No. 62/054,740, filed on Sep. 24, 2014.

(51) Int. Cl.
| | |
|---|---|
| *H04B 17/309* | (2015.01) |
| *H04B 17/10* | (2015.01) |
| *H04B 7/04* | (2006.01) |
| *H04B 7/06* | (2006.01) |

(52) U.S. Cl.
CPC .......... *H04B 17/309* (2015.01); *H04B 7/0452* (2013.01); *H04B 7/0617* (2013.01); *H04B 17/104* (2015.01)

(58) Field of Classification Search
CPC ...... H04B 7/043; H04B 7/0617; H04W 16/28
See application file for complete search history.

(56) References Cited

U.S. PATENT DOCUMENTS

| | | | | |
|---|---|---|---|---|
| 2012/0033761 | A1* | 2/2012 | Guo | G01S 3/023 375/316 |
| 2014/0044044 | A1* | 2/2014 | Josiam | H04W 24/10 370/328 |

OTHER PUBLICATIONS

Hong, S. et al., "Cognitive spatial degrees of freedom estimation via compressive sensing," CoRoNet, Sep. 2010, pp. 7-12.
Joshi, K. et al., "Pinpoint: Localizing interfering radios," NSDI, Apr. 2013, pp. 241-253.
Xiong, J. et al., Arraytrack: A fine-grained indoor location system,: NSDI, Apr. 2013, pp. 71-84.
Yoon, J. et al., "Probeam: A practical multicell beamforming system for OFDMA small-cell networks," MobiHoc, Jul. 2013, pp. 147-156.
Yoon, S. et al., "Hybrid beam-forming and beam-switching for OFDM based wireless personal area networks," JSAC, Oct. 2009, pp. 1425-1432, vol. 27, Issue 8.

* cited by examiner

*Primary Examiner* — Nguyen Vo
(74) *Attorney, Agent, or Firm* — Joseph Kolodka

(57) ABSTRACT

Methods and systems for beam forming include measuring channel state information for a set of different codebook entries. An angle of arrival (AoA) distribution is determined with a processor using compressive testing based on the measured channel state information. A set of phase shift values is determined based on the determined AoA to perform phased array beamforming.

10 Claims, 4 Drawing Sheets

EFFICIENT LARGE-SCALE MULTIPLE INPUT MULTIPLE OUTPUT COMMUNICATIONS

RELATED APPLICATION INFORMATION

This application claims priority to provisional application 62/011,196, filed Jun. 12, 2014, and provisional application 62/054,740, filed Sep. 25, 2014, the contents thereof being incorporated herein by reference.

BACKGROUND OF THE INVENTION

Large-scale, multi-user, multiple-input multiple-output (MIMO) architectures typically increase the hardware and software complexity of wireless systems by increasing the number of radio frequency (RF) chains to increase both multiplexing and beamforming gains. This results in poor throughput efficiency, due to the increased energy consumption and wireless channel hardening; high coordination overhead due to maintaining fine-grained coordination of a large number of antennas; and no support from existing high-speed wireless standards and hardware.

Existing attempts to combine analog beamforming with digital RF chains include integrating phase-array antennas with non-MIMO base stations (BSes). However, these approaches choose an optimal beam pattern using an exhaustive search of all codebook entries, which scales with the size of the phased-array antenna. Faster beam searches, such as those based on simulated annealing, can reduce the search time, but the overhead still increases with the size of the phased array.

Joint optimization schemes have also been proposed for beamforming. However, these use tight integration between the analog phased array and the digital RF chains. This level is not feasible for a solution that is to be backwards compatible with existing BSes.

Two-level beamforming is also employed in such areas as MIMO radar. However, such systems are purpose-built for object tracking, not communications, and also have tight coordination between analog and digital RF components. The distributed coordination scheme increases throughput through opportunistic use of degrees of freedom, but this needs precise clock phase and frequency synchronization. Other centralized, coordinated, multipoint systems demonstrate gains from cooperative transmissions across access points, but these gains come at the cost of significant synchronization and inter-cell channel state information (CSI) sharing overhead. Such overhead is not practical for large-scale deployment in real-world cellular networks.

BRIEF SUMMARY OF THE INVENTION

A method for beam forming includes measuring channel state information for a set of different codebook entries. An angle of arrival (AoA) distribution is determined with a processor using compressive testing based on the measured channel state information. A set of phase shift values is determined based on the determined AoA to perform phased array beamforming.

A system for beam forming includes a channel state information module configured to measure channel state information for a set of different codebook entries. An angle of arrival (AoA) module is configured to determine an AoA distribution using compressive testing based on the measured channel state information. A phase control module is configured to determine a set of phase shift values based on the determined AoA to perform phased array beamforming.

DETAILED DESCRIPTION

Embodiments of the present principles recognize that performance gains in a multi-user, multiple input, multiple output (MIMO) network include at least two components: multiplexing gains and beamforming gains. Multiplexing gains depend on the number of radio frequency (RF) chains and affect the number of concurrent users that the network can support. On the other hand, beamforming gains only depend on the number of antennas and affect the throughput that each user can achieve. Multiplexing gains are obtained using fine-timescale, frame-by-frame coordination, while beamforming gains can be obtained using relatively coarse-timescale control. By increasing only the beamforming gains, the present embodiments increase the capacity of the network without encountering the challenges that arise from increased multiplexing.

The present embodiments use two-level beamforming, where instead of omni-directional antennas, phased-array antennas are used at the base station (BS). Each RF chain in the BS drives a phased-array antenna, and each antenna has multiple antenna elements. The two-level beamforming uses coarse-grained analog beamforming that is performed by the phased-array antenna with a fine-grained, digital, multi-user MIMO precoding component implemented by the RF chains.

Figure 1:
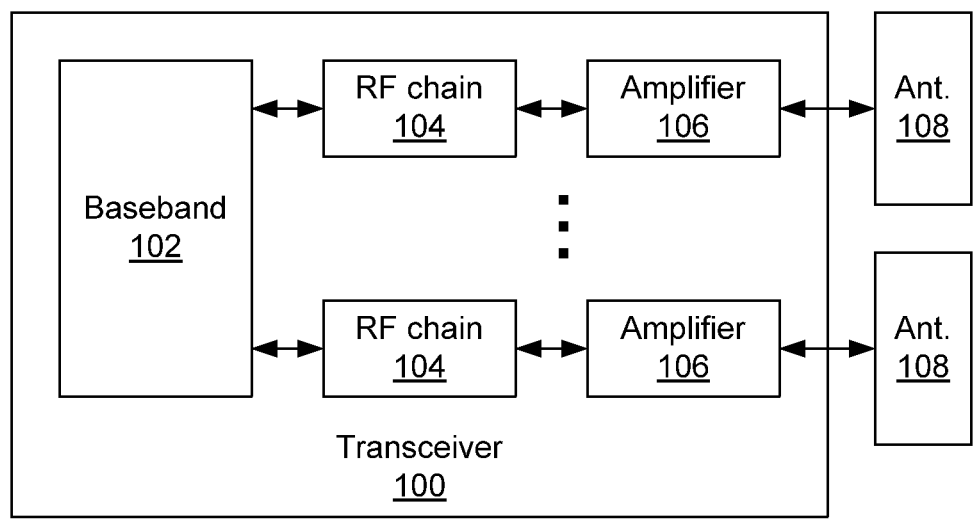
FIG. 1 is a block diagram of a phased-array transceiver in accordance with the present principles.

Referring now to FIG. 1, a two-level beamforming architecture 100 is shown. The beamforming architecture 100 may be implemented in a transceiver, base station, or set top box. A baseband 102 accepts information from, e.g., a backhaul network or wired network and manages an interface between wireless communications and conventional networks. The baseband 102 passes information to be transmitted to a set of RF chains 104 which perform digital processing on the one or more signals to handle digital-side multiplexing tasks and transmit the signal, which may include modulation of baseband in-phase (I) and quadrature (Q) signals into passband signals. The output of each RF chain 104 is amplified in an amplifier 106 and passed to a respective phased array antenna 108, which implements analog beamforming across to a desired beam pattern. In particular, each phased array antenna 108 includes multiple individual antennas, each associated with a phase shifter. The phase shifters are set such that the emitted RF signals interfere and produce maxima in the direction of wireless clients. For received signals, the phased array antennas 108 provide a beamformed signal to amplifier 106 before the signal is received by the RF chain 104 and passed along to the baseband 102.

Digital precoding and analog beamforming are therefore performed separately. The RF chains 104 can therefore be left in place in legacy base stations 100. The digital precoding eliminates residual interference between users after analog beamforming, which itself is performed on a relatively coarse timescale to direct the transmitted signal toward the intended client(s).

Figure 2:
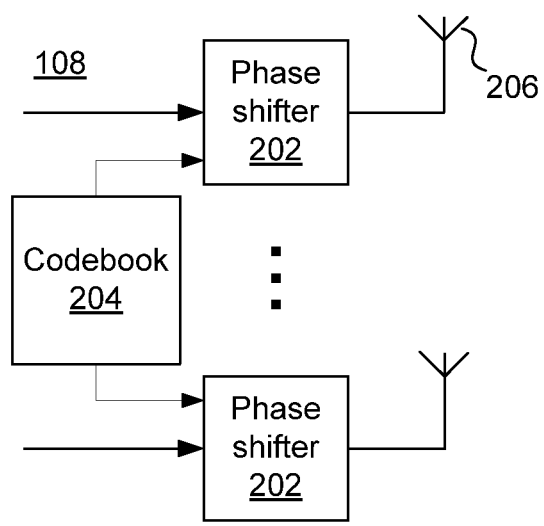
FIG. 2 is a block diagram of a phased-array antenna in accordance with the present principles.

Referring now to FIG. 2, additional detail on a phased array antenna 108 is shown. The phase shifters 202 each receive an equal copy of the passband signal. The phase array antennas 108 are controlled according to a codebook 204 which stores a set of phase-shifter values to define how the phase shifters 202 delay their respective signals. Individual antenna elements 206 transmit and receive the signals that are shifted by the phase shifters 202. The phased array antenna 108 changes between entries in the codebook 204 to change the direction in which signal energy is focused. Beamforming patterns may be relatively coarse, such that each phased array antenna 108 may be assigned to a single user. However, due to the coarseness of the beam control, there may be residual interference between different users, which is cured by the RF chains 104.

Two-level beamforming in the present embodiments operates on two different timescales. Each frame transmission follows a fast-timescale process, where the transmitted signal undergoes two-level beamforming before being transmitted. Management and update of the phased-array antennas 108 occurs over a slower timescale. This includes composite channel state information (CSI) management, compressive angle of arrival (AoA) measurement, and beam selection.

A base station 100 cannot access signal information from each of the phased array antenna elements 206. Instead, given a particular codebook entry, the phased array antenna 108 combines the signals on the antenna elements 206, weighted by the codebook entry, and returns only the combined signal to the RF chain 104. Since the digital multi-user MIMO precoder does not know about the phased-array antenna, it treats the composite CSI information as it would any other CSI when computing an appropriate precoder.

Conventional beamforming is based on the AoA of signals. The optimal beam direction is one that follows the transmission angle that results in the smallest signal attenuation at the receiver. However, lacking signal information from the individual antenna elements 206, direct computation of AoA is not possible. Furthermore, an exhaustive search over all AoA is too time-consuming to be practical. As such, the present embodiments can efficiently estimate the AoA from just four composite CSI measurements. AoA measurement overhead is thereby kept constant, regardless of how many antenna elements 206 are used. AoA measurements are then used to determine beam directions that both maximize the signal power at its intended user(s) while minimizing the interference to other users in adjacent cells. These beam directions are selected using signal to leakage power ratio (SLR).

AoA is estimated using the fact that the composite CSI is related to AoA via an inverse discrete space Fourier transform (IDSFT) and the fact that the actual AoA distribution is sparse. Significant AoA components can then be recovered using only a small, fixed number of CSI measurements.

A uniform linear array with antenna elements 206 arranged in a line with equal spacing between them is first described. When a signal from a single user arrives at a phased array antenna 108, antenna elements 206 i that are spaced a distance d apart have respective propagation distances according to an AoA θ of the incoming signal relative to the line of the angles, according to:

$$\tau_i(\theta) = (i-1)\frac{d\sin(\theta)}{c}$$

where c is the speed of light. For signals originating from users that are far away, the signals arriving at the phased array antenna 108 can be assumed to be parallel. The phase difference measured by all antenna elements 206 is thus given by the column vector:

$$\phi(\theta) = [1, e^{j2\pi f_c \tau_2(\theta)}, \ldots, e^{j2\pi f_c \tau_L(\theta)}]^T$$

where $f_c$ is the carrier frequency and L is the number of antenna elements 206. For a single user with P multipath signals $s_1, \ldots, s_P$ arriving at the base station 100, the received signal at the L antenna elements is:

$$r = [\phi(\theta_1), \ldots, \phi(\theta_P)][s_1, \ldots, s_P]^T + n$$

where n is the channel noise energy.

To find the AoA distribution, the angular space is discretized into D distinct, equally spaced angles $\theta_1, \ldots, \theta_D$. The discrete angular space is then scanned and the gain at each discrete angle is determined. This scanning process for the $i^{th}$ user at the $k^{th}$ phased array antenna 108 uses a correlation matrix $\Phi$. The expression for the AoA distribution is then $a_i^k(\theta) = \Phi r$.

However, this procedure uses D separate probes for each possible angle, each using a different row of the matrix $\Phi$ as the active codebook entry. The present embodiments avoid this overhead by estimating the AoA from the CSI measurements of the channel. Assuming for the sake of simplicity that the AoA between a single phased-array antenna 108 and the $l^{th}$ user in the cell. The measured CSI is related to the AoA distribution via the IDSFT:

$$h_l = F^{-1} a_l^k(\theta)$$

where $F^{-1}$ is the IDSFT matrix and h is the (non-composite) CSI vector between the base station 100 and the $l^{th}$ user. The actual CSI AoA relationship employed by the present embodiments is:

$$\hat{h}_l = b^T h_l = b^T F^{-1} a_l^k(\theta)$$

where b is a vector specifying the weights of each of the phase shifters 202 and $(.)^T$ is the transpose operator. $\hat{h}_l$ is the composite CSI between the phased array antenna 108 and the $l^{th}$ user.

However, the addition of the analog beamforming weights makes the CSI-AoA relation above non-invertible, as there may be multiple AoA distributions that can map to the same composite CSI. The present embodiments rely on AoA sparsity to select a single AoA from the multiple possibilities.

Figure 3:
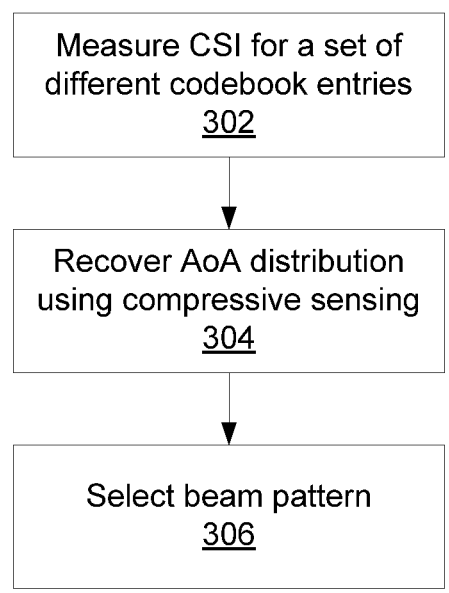
FIG. 3 is a block/flow diagram of a method for beam selection based on angle of arrival in accordance with the present principles.

Referring now to FIG. 3, a method for estimating AoA is shown. Block 302 performs a set (e.g., 4) of CSI measurements using different codebook entries and block 304 uses those CSI measurements to recover a best AoA distribution. Empirical measurements have shown that AoA distribution is clustered. In a typical multipath environment, the dominant multipath components arrive at the receiver from a limited set of distinct directions. The signal gain at other AoAs are small and thus can be ignored as they do not contribute significantly to the fidelity of the received signal. Discretizing angular space into D=360 equally spaced angles, the P<5 dominant signal paths is much less than the possible AoAs and is thus sparse. The signal gains along paths outside the P dominant ones are low and can be ignored as they do not contribute significantly to the decodability of the signal at the phased array antennas 108. Because AoA distribution is sparse, it can be recovered from only a small, fixed number of composite CSI measurements. Once the AoA distribution has been recovered, block 306 selects a beam pattern corresponding to the AoA distribution.

Letting $\hat{h}_{s,c}^{(1)}, \ldots, \hat{h}_{s,c}^{(V)}$ be V different composite CSI measurements measured by block 302, each taken with a different active codebook entry $b^{(1)}, \ldots, b^{(V)}$, the AoA distribution can be recovered using compressive sensing in block 304 via:

$$\hat{a}_l^k(\theta) = \arg\min \|a_l^k(\theta)\|_2$$

$$\text{s.t. } \hat{h}_{s,c}^{(1)} = b^{(v)} F^{(-1)} a_l^k(\theta), \; 1 \leq v \leq V$$

where $\|.\|_2$ denotes the L2 norm. It has been empirically shown that V=4 is sufficient for recovering $\hat{a}_l^k(\theta)$ accurately, where $\hat{a}_l^k(\theta)$ represents a specific distribution of energy such that the relationship between CSI and AoA distribution is governed by the IDSFT, while $a_l^k(\theta)$ is an arbitrary distribution of signal energy given the incident angle $\theta$ of the signal. This can be used in particular for using circular phased array antennas, rather than simply linear arrangements.

Block 306 may simply use a phased-array codebook entry that has a direction closest to the estimated AoA. However, a superior approach is to choose a beam direction that maximizes the ratio of the signal energy to an intended user to one that is either a user in the local cell that is assigned to a different phased-array or to a user in an adjacent cell. This is a signal-to-leakage-power ratio (SLR).

Block 306 therefore first computes the optimal beam between every phased-array antenna 108 and every downstream user. Each phased-array antenna 108 only directs its beam toward a single user. Hence, each user is assigned to the phased-array antenna 108 that can maximize its SLR. The AoA distribution to users in both local and adjacent cells is used to compute the SLR distribution, defined as:

$$\eta_l^k(\theta) = \frac{a_l^k(\theta)}{\sum_{d \in C_U} a_d^k(\theta)}$$

where l is the user, k is an antenna 108, and $C_U$ is the set of all other users. The optimal beam direction from the phased array to the user is the one that has the maximum SLR:

$$\hat{\theta}_l^k = \arg\max_\theta \eta_l^k(\theta)$$

This provides an optimal beam direction between every phased-array antenna 108 and every user. Block 306 constructs a one-to-one mapping between users and phased-array antennas 108 so that the SLRs at the users are maximized. Block 306 then activates the codebook entry in each phased array that corresponds to the beam direction that most closely matches the optimal direction.

Figure 4:
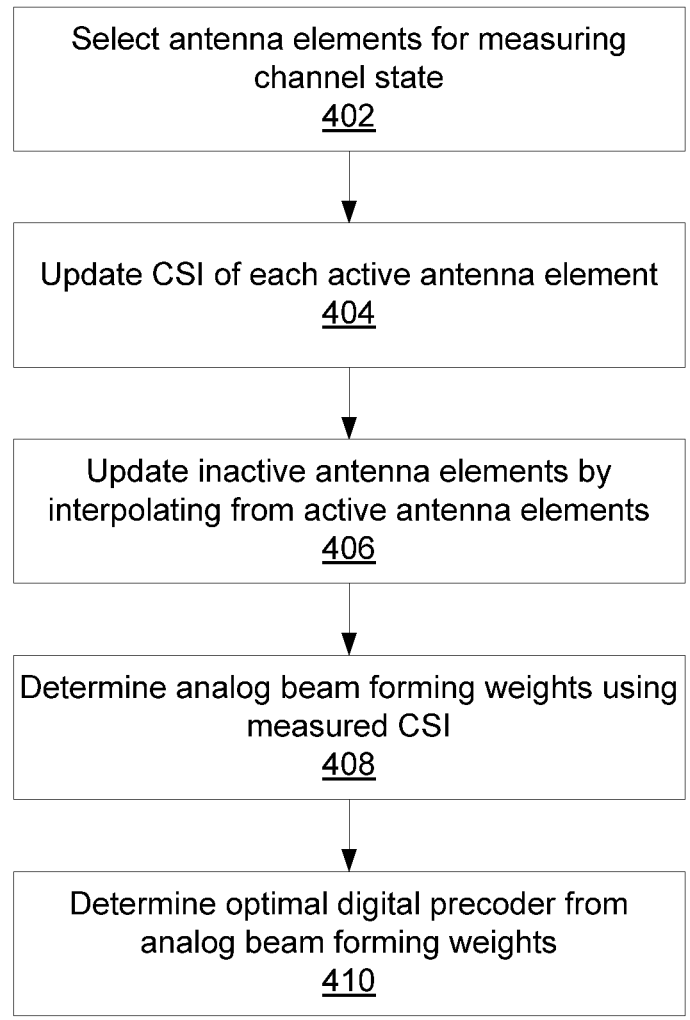
FIG. 4 is a block/flow diagram of a method for beam selection based on channel state information in accordance with the present principles.

Referring now to FIG. 4, a method for determining beam forming weights and the digital pre-coder is shown. Block 402 randomly selects a set of active antenna elements in which to measure the channel state. Block 404 then updates the CSI of only the active antenna elements. Block 406 updates the inactive antenna elements by interpolating the channel state from adjacent active antenna elements. Block 408 determines the analog beam forming weights using the measured CSI obtained previously, while block 410 determines the optimal digital pre-coder from the analog beam forming weights.

Mathematically, a MIMO system with L single-antenna clients, M RF chains 104, S subcarriers, and I antenna elements 108 can be specified as:

$$y_s = H_s B W_s X_s + n$$

with $s \in (1, \ldots, S)$, where $y_s$ is the received client signals and $H_s$ is the CSI on the $s^{th}$ subcarrier. $W_s = (H_s B)^+$ is the M×N digital zero-forcing precoder. $B = \text{diag}(b_1, \ldots, b_M)$ is the block diagonal matrix of the analog precoder applied by the phased array antennas 108. $b_i = [b_1^i, \ldots, b_L^i]^T \in \mathbb{C}$, $i=1, \ldots, L$ is the phase shift due to the $k^{th}$ antenna element of the array and $\mathbb{C}$ is a discrete codebook of possible beam patterns. It should be noted that B is constant over all subcarriers.

Adopting a two-timescale approach to obtaining $W_s B$ includes computing the fine precoder $W_s$ on a per-frame basis, while B is estimated over a longer time interval. CSI measurement overhead is thereby minimized. The optimal beam shape B maximizes the capacity of the channel to downstream clients. Hence:

$$B = \arg\max_b \sum_{1 \leq s \leq S} \log_2 \det(I + H_s B B^T H_s^T)$$

To estimate B in block 408, the CSI on the $s^{th}$ subcarrier $H_s$ is estimated in block 404. This can be accomplished by taking advantage of two features of phased array antennas: the channel of multiple adjacent antennas are often correlated and phased-array antennas can switch between different beams very quickly (e.g., about 1.2 μs). The correlation implies that the channels at the antenna elements will vary similarly over time, even though their exact values are different. Correlation means that channel gains of antenna elements increase and decrease by similar scales over time, such that the channel gain difference is stable. This should not be confused with correlation of the channel matrix itself, which is a snapshot of all antenna elements' channel gains and determines the channel rank.

Letting $H_s = [h_1^T, \ldots, h_L^T]^T$, where $h_l$ is the channel state vector between the $l^{th}$ antenna element 206 and the downstream clients, only a subset of $h_l$ values will be updated during each estimation process. The antenna elements 206 corresponding to these values are defined as the active set, while the other antenna elements 206 defined as the inactive set. The active and inactive sets are, e.g., randomly chosen for each estimation round. The respective sets are denoted as $\mathcal{L}_{active}$ and $\mathcal{L}_{inactive}$ respectively by block 402. The set of active antennas is selected to that, over several training frames, all antenna elements 206 are eventually sampled uniformly. Hence, for every B update, K antenna elements 206 are randomly selected to be in the active set. K is a tunable parameter and depends on the number of training symbols in the default training scheme. The longer the training frame, the more antenna elements 206 can be trained in a single frame.

A single training frame is used to obtain the CSI from a subset of antenna elements 206 in block 404. The phased array antenna 108 cycles over the active set of its antenna elements by periodically changing its active receiving antenna while receiving the training frame. The channel $h_l$ at east of the selected antenna elements 206 can then be computed by the hybrid controller.

The inactive elements will vary over time in a similar manner to those in the active set. Each antenna in the inactive set is updated based on an antenna in the active set with the shortest spatial distance. This ensures maximum spatial and temporal correlation between the active and inactive antennas. As such:

$$h_{l,i} = h_{l,i}^{(-1)}\left(1 + \frac{\|h_{k_l,i}\| - \|h_{k_l,i}^{(-1)}\|}{\|h_{k_l,i}\|}\right)e^{j\left(\angle h_{k_l,i} - \angle h_{k_l,i}^{(-1)}\right)}$$

where $h_{l,i}$ is the $i^{th}$ element of the vector $h_l$, $h_{l,i}^{(-1)}$ is the previous measured value of $h_l$, and $k_l$ is the index of the closest active antenna element to 1 with $l \in \mathcal{L}_{inactive}$, $k_l \in \mathcal{L}_{active}$, and $1 \leq i \leq N$. The beam B is determined as stated above, recalling that B defines a coarse beam pattern and is updated less frequently than the CSI needed by the RF chains 104. Even though estimated channel states are used for computing B, experiments have shown that the beam pattern chosen is identical to that obtained from precise, instantaneous channel measurements.

Once B is estimated, the digital precoder is computed using zero-forcing, $W_s = (H_s B)^+$, where $(.)^+$ is the matrix pseudoindex. There will be two different versions of $W_s$ depending on whether B, which is updated less frequently, is being concurrently updated. If B is updated with the latest training frame, then the estimated channel state $H_s$ is used as described above. If not, then the phase shifters 202 are already programmed according to the previously selected B. Thus, the precoder of the RF chains 104 obtains the actual $H_s B$ used for computing $W_s$.

At a high level, interfering cells cooperate to select analog beams B that minimally interfere with one another. Similar to the single-cell case, this is performed over a longer timescale of several frames or even several seconds. Transmissions within a single cell are then carried out using local, digital multi-user MIMO precoding without any need for inter-cell interference nulling or alignment. Because the analog beam information only needs to be exchanged on a coarse timescale, coordination can easily take place over existing inter-cell control channels.

In a multi-cell scenario, inter-cell interference can be avoided by ensuring that the phased-array beam patterns create minimal interference in adjacent cells. However, beam patterns that have non-overlapping antenna gains cannot be realistically selected. Due to multipath effects in outdoor environments, the actual beam radiation patterns do not always match the theoretical patterns. As a result, the beams in a cell are selected to maximize capacity in the local cell and minimize interference to adjacent cells. For a given cell, $H_s^{(i)}$ is the CSI to the clients served by the $i^{th}$ adjacent cell. Hence, for multiple cells, block 408 performs:

$$B = \underset{B}{\arg\max} \frac{\sum_{1 \leq s \leq S} \log_2 \det(I + H_s B B^T H_s^T)}{\sum_i \sum_{1 \leq s \leq S} \log_2 \det(I + H_s^{(i)} B B^T H_s^{(i)T})}$$

The last digital precoder, $W_s$, is computed by each cell on a per-frame basis, without any further inter-cell coordination. The selected analog beam pattern, B, steers the local multi-user MIMO transmission direction to minimize inter-cell interference.

Each cell obtains the CSI both to its local clients and to clients that are being served by adjacent cells. The CSI to clients of adjacent cells can be obtained in a similar manner to which local CSI is estimated. Such inter-cell CSI is already used for ordinary coordinated network MIMO. Hence this does not impose any additional coordination overhead. In fact, given that the coarse CSI is only to be estimated over a long time period, the present embodiments sharply reduce the inter-cell coordination over that of a traditional network MIMO architecture.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
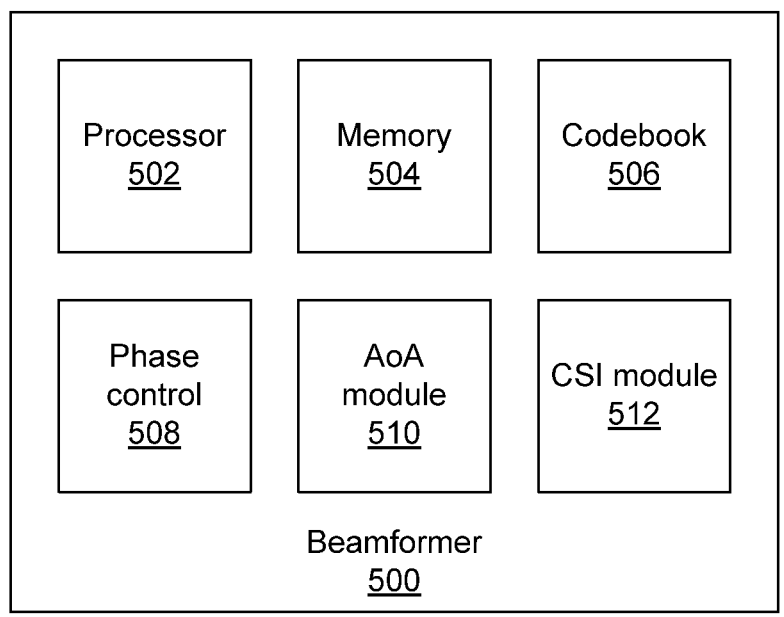
FIG. 5 is a block diagram of a beamforming system in accordance with the present principles.

Referring now to FIG. 5, a system for beam selection is shown in beamformer 500. Beamformer 500 may be part of a transceiver, base station, or set top box and includes a processor 502 and memory 504, the latter of which stores the codebook 506 that includes associations between phase shift values for different antennas and a desired beam pattern. A phase control module 508 provides control signals to the phase shifters 202 to implement a particular beam pattern. To determine the beam pattern to use, AoA module 510 uses CSI information measured by CSI module 512 to determine an AoA for users. The processor 502 determines what the appropriate beam weights are and may also perform pre-coding for the RF chains 104.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A and Appendix B to the application. It is to be understood that the embodiments shown and described herein are only illustrative of the principles of the present invention and that those skilled in the art may implement various modifications with-

The invention claimed is:

1. A method for beam forming, implemented in a user equipment used in a communication system, the method comprising:
   measuring channel state information for each of a set of different codebook entries;
   determining an angle of arrival (AoA) distribution with a processor using compressive sensing based on the measured channel state information;
   determining a set of phase shift values based on the determined AoA; and
   controlling a set of phase shifters in accordance with respective phase shift values of the determined set of phase shift values to perform phased array beamforming.

2. The method of claim 1, wherein the CSI is related to the AoA by an inverse discrete space Fourier transform.

3. The method of claim 2, wherein determining the AoA comprises solving:

$$\hat{a}_I^k(\theta) = \arg\min \|a_I^k(\theta)\|_2$$

$$\text{s. t. } \hat{h}_{s,c}^{(1)} = b^{(v)} F^{(-1)} a_I^k(\theta), 1 \leq v \leq V$$

where $a_I^k(\theta)$ is an arbitrary distribution of signal energy given the incident angle $\theta$ of the signal, $\hat{a}_I^k(\theta)$ represents a specific distribution of energy, $\hat{h}_{s,c}^{(1)}$ is a CSI measurement taken with codebook entries $b^{(1)}, \ldots, b^{(V)}$, where $1 \leq v \leq V$ and V is a number of total CSI measurements, and where $F^{-1}$ is an inverse discreet space Fourier transform matrix.

4. The method of claim 1, wherein a set of phase shift values is selected to maximize signal-to-leakage-power ratio (SLR) between a phased-array antenna and a respective user.

5. The method of claim 4, wherein the SLR is measured as a ratio between the AoA distribution from the phased-array antenna to the respective user and a sum of AoA distributions from the phased-array antenna and concurrently active users in adjacent cells.

6. A base station used in a communications system, comprising:
   a channel state information module configured to measure channel state information for each of a set of different codebook entries;
   an angle of arrival (AoA) module comprising a processor configured to determine an AoA distribution using compressive sensing based on the measured channel state information; and
   a phase control module configured to determine a set of phase shift values based on the determined AoA to perform phased array beamforming.

7. The system of claim 6, wherein the CSI is related to the AoA by an inverse discrete space Fourier transform.

8. The system of claim 7, wherein determining the AoA comprises solving:

$$\hat{a}_I^k(\theta) = \arg\min \|a_I^k(\theta)\|_2$$

$$\text{s. t. } \hat{h}_{s,c}^{(1)} = b^{(v)} F^{(-1)} a_I^k(\theta), 1 \leq v \leq V$$

where $a_I^k(\theta)$ is an arbitrary distribution of signal energy given the incident angle $\theta$ of the signal, $\hat{a}_I^k(\theta)$ represents a specific distribution of energy, $\hat{h}_{s,c}^{(1)}$ is a CSI measurement taken with codebook entries $b^{(1)}, \ldots, b^{(V)}$, where $1 \leq v \leq V$ and V is a number of total CSI measurements, and where $F^{-1}$ is an inverse discreet space Fourier transform matrix.

9. The system of claim 6, wherein the phase control module is further configured to select a set of phase shift values to maximize signal-to-leakage-power ratio (SLR) between a phased-array antenna and a respective user.

10. The system of claim 9, wherein the SLR is measured as a ratio between the AoA distribution from the phased-array antenna to the respective user and a sum of AoA distributions from the phased-array antenna and concurrently active users in adjacent cells.

* * * * *